(74.)
THOMAS BERRY.
Improvement in Harvesters.
No. 4,711. Reissued Jan. 16, 1872.
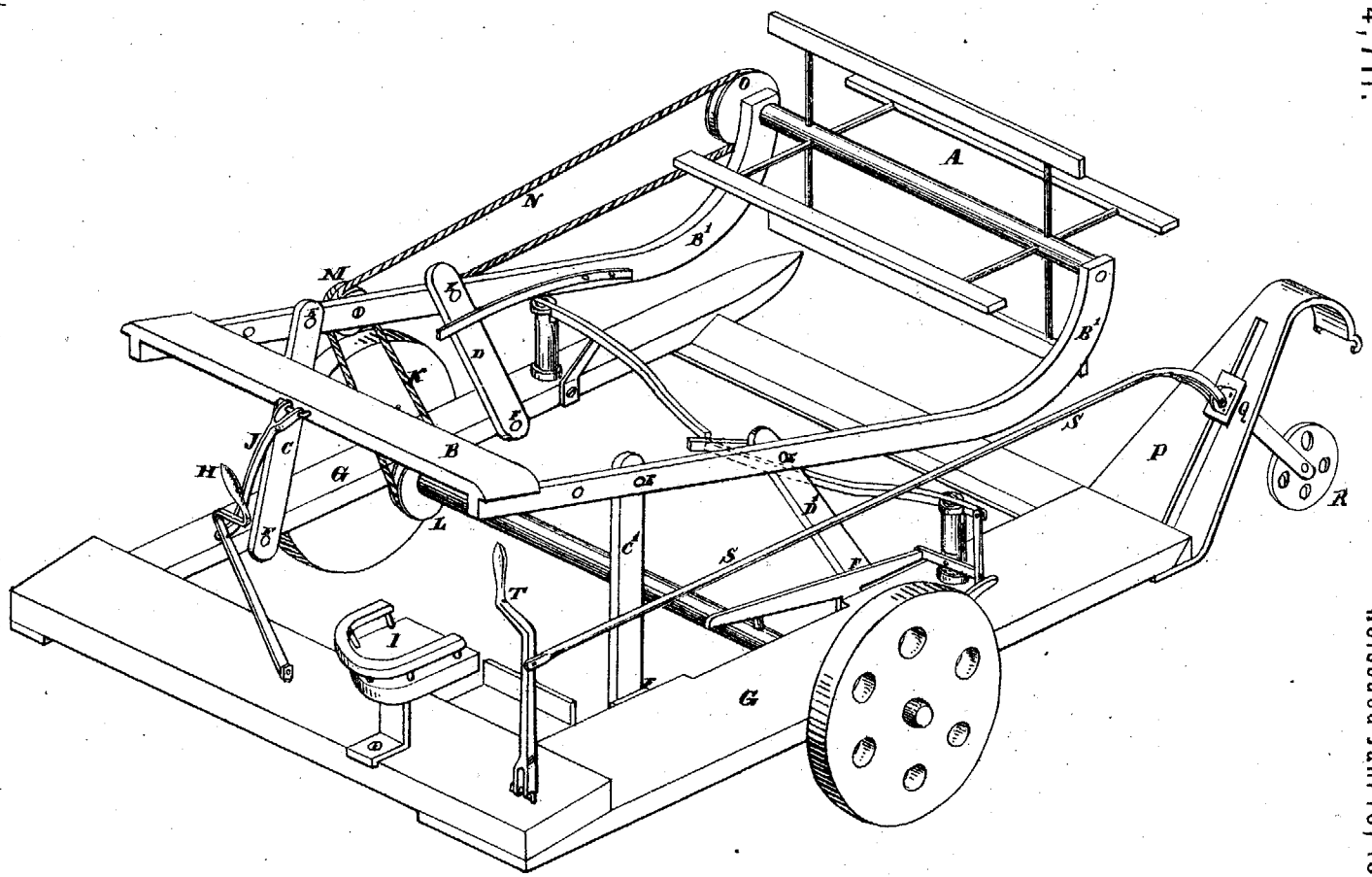
Witnesses
G. L. Marshall
Enoch Berry
Inventor
Thomas Berry
AM. PHOTO-LITHOGRAPHIC CO. N.Y. (OSBORNE'S PROCESS.)

UNITED STATES PATENT OFFICE.

THOMAS BERRY, OF LOUISBURG, KENTUCKY, ASSIGNOR TO JOHN F. SEIBERLING, OF AKRON, OHIO.

IMPROVEMENT IN HARVESTERS.

Specification forming part of Letters Patent No. 20,618, dated June 22, 1858; reissue No. 4,711, dated January 16, 1872.

DIVISION B.

*To all whom it may concern:*

Be it known that I, THOMAS BERRY, of Louisburg, in the county of Mason and State of Kentucky, have invented certain new and useful Improvements in Adjustable Reels for Harvesting-Machines; and I do hereby declare the following to be a full, clear, and exact description of the same, reference being had to the accompanying drawing which forms a part of this specification.

The drawing represents a perspective view of a harvesting-machine, having my improved reel device attached thereto, thus illustrating one mode of applying my said improvements, which form the subject-matter of this division of reissue, to practical use.

My invention relates to certain improvements in reel-attachments for harvesting-machines, whereby the reel can be quickly and conveniently adjusted, or moved up and down to various heights, as may be desired, by the attendant or driver from his seat upon the machine.

In the drawing, the part marked A represents the reel, which is supported in bearings at the forward ends of two curved longitudinal side-bars, B′, of an adjusting frame, B B′, which frame is supported by swing standards C C′ D D′, pivoted at their upper ends at E E E E to the adjusting frame B B′, and at their lower ends, at F F F F, to the frame G of the harvesting-machine, whereon the reel, in this instance, is used. The upper ends of each pair C D and C′ D′ being arranged much nearer to each other than their lower ends, as indicated, and as the standards are swung forward carrying the frame B B′, the tops of the forward standards D D′ swing in an upward arc, and the top of the standards C C′ at the same time swing in a downward arc, thus causing the forward end of the frame B B′ and reel A to be thrown upward, and the rear end of the frame B B′ to be thrown downward, and when the standards are swung backward the opposite effect takes place. All of the pivot-joints are loose, so as to allow of the front end of the frame being easily swung up or down to adjust the reel A to the height of stalks which are to be cut, or for any other purpose. H indicates a hand-lever, situated at a convenient position near the driver's seat I, and fulcrumed to the machine frame G, so as to be readily accessible to his hand. Said lever H is connected by a suitable rod or link, J, to the rear part of the reel-adjusting frame, and by operating the lever H the driver or attendant can quickly and conveniently adjust the reel to any desired position without leaving his seat upon the machine. K indicates a band leading from a pulley, L, on the propelling axle of the machine to a double pulley, M, arranged on the side of the frame B B′, and from the double pulley M a band, N, extends to a pulley, O, fixed to the axle of the reel A. By this arrangement of bands and pulleys, motion is transmitted from the propelling axle of the machine to the reel A, while the frame B B′ can be adjusted to different positions without deranging or materially slackening the bands. This is owing to the fact that the lower ends of the standards C and D are pivoted to the frame G on a line or nearly so with the axis of the driving-pulley L, while their upper ends in like manner are pivoted to the reel-frame B B′ in line, or nearly so, with the axis of the pulley M, the pulleys being arranged centrally between the standards, and as the frame is moved to adjust the reel, the portion of the frame B B′ in front of the axis of the pulley M is elevated, while the portion of said frame in rear thereof is depressed, causing the axis of said pulley M to swing in a curve approaching the arc of a circle when the frame is moved, the center of which circle is coincident with the axis of the propelling shaft or nearly so; hence the pulley M is at all times at nearly the same distance from the pulley L, and therefore the band suffers no practical derangement from the change in position of the frame.

It will be observed that a shoe or plate, P, is attached to the front of the frame G in an inclined or oblique position, and a movable block, Q, is arranged to work in a longitudinal groove formed in said plate. To this block Q is fixed the standard of the forward supporting wheel R of the machine, and the forward end of the machine frame G can be raised or lowered to adjust the height of the cutters from the ground by moving the block Q forward or back in the grooved plate or shoe P, thus placing it higher or lower on the incline. A rod, S, extends from the block Q to a hand-lever, T, near the driver's seat, whereby the driver can conveniently move the block Q and adjust the height of the forward part of the frame without leaving his seat or position on the machine.

Those skilled in the art to which my invention belongs will readily appreciate the practical advantages of my said improvements, by means of which the driver from his seat or position on the machine can, by means of lever-connections, elevate or depress the reel independently of the cutting apparatus to suit the height of crop to be cut, or for any other purpose, and also in addition thereto he can elevate or depress the front part of the machine or cutting apparatus.

As the general construction of the harvester to which my improvements covered by this division of reissue are shown applied, is more fully described in another division of reissue bearing even date herewith, no further description thereof is herein necessary.

Having described one mode in which my said improvements may be applied to practical use, what I claim as my invention, and desire to have secured by Letters Patent in this division of reissue, is—

1. The combination of a harvester-reel, having a single axis of rotation, an adjustable reel-supporting frame, and an adjusting lever, arranged in relation to the driver's seat, substantially as described, so that the shaft of the rotating reel can be adjusted positively in both directions up or down, by means of the adjusting lever and by the driver from his seat on the machine.

2. The combination, with the reel-supporting frame B B′, of the swinging standards C C′ D D′, substantially as and for the purposes set forth.

THOMAS BERRY.

Witnesses:
S. L. MARSHALL,
ENOCH BERRY.

(74)